United States Patent
Eom et al.

(10) Patent No.: US 12,347,848 B2
(45) Date of Patent: Jul. 1, 2025

(54) METHOD FOR PREPARING POSITIVE ELECTRODE ACTIVE MATERIAL FOR LITHIUM SECONDARY BATTERY AND POSITIVE ELECTRODE ACTIVE MATERIAL PREPARED THEREBY

(71) Applicant: LG Chem, Ltd., Seoul (KR)

(72) Inventors: Jun Ho Eom, Daejeon (KR); Dong Joon Ahn, Daejeon (KR); Chae Jin Lim, Daejeon (KR); Ji Hye Kim, Daejeon (KR); Byoung Hun Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 672 days.

(21) Appl. No.: 17/609,555

(22) PCT Filed: Jul. 20, 2020

(86) PCT No.: PCT/KR2020/009520
§ 371 (c)(1),
(2) Date: Nov. 8, 2021

(87) PCT Pub. No.: WO2021/015511
PCT Pub. Date: Jan. 28, 2021

(65) Prior Publication Data
US 2022/0231281 A1    Jul. 21, 2022

(30) Foreign Application Priority Data
Jul. 22, 2019  (KR) .......................... 10-2019-0088560

(51) Int. Cl.
*H01M 4/36*    (2006.01)
*C01B 35/12*   (2006.01)
(Continued)

(52) U.S. Cl.
CPC ............ *H01M 4/366* (2013.01); *C01G 53/50* (2013.01); *H01M 4/04* (2013.01); *H01M 4/505* (2013.01);
(Continued)

(58) Field of Classification Search
USPC ....................................................... 429/223
See application file for complete search history.

(56) References Cited

U.S. PATENT DOCUMENTS

2008/0131778 A1    6/2008  Watanabe et al.
2014/0154581 A1    6/2014  Kawasato et al.
(Continued)

FOREIGN PATENT DOCUMENTS

CA    2369030 C    *    2/2006    ........ H01M 10/4235
CN    103500827 A        1/2014
(Continued)

OTHER PUBLICATIONS

Extended European Search Report including Written Opinion for Application No. 20843087.6 dated May 17, 2022, pp. 1-6.
(Continued)

*Primary Examiner* — Allison Bourke
*Assistant Examiner* — Robert Gene West
(74) *Attorney, Agent, or Firm* — Lerner David LLP (57) ABSTRACT

A positive electrode material, a positive electrode including the same, a lithium battery including the same, and a method of preparing the same are disclosed herein. In some embodiments, a method of preparing a positive electrode active material including forming a first coating layer on a surface of a lithium transition metal oxide represented by Formula 1 using a basic aqueous solution containing a coating element $M^1$ (where $M^1$ includes at least one selected from sodium (Na) and aluminum (Al)), dry-mixing the lithium transition metal oxide having the first coating layer formed
(Continued)

on a surface thereof, and a raw material containing a coating element $M^2$ (where $M^2$ includes boron (B)) and heat treating the mixture to form a second coating layer.

15 Claims, 3 Drawing Sheets

(51) Int. Cl.

| | | |
|---|---|---|
| *C01F 7/78* | (2022.01) | |
| *C01G 53/50* | (2025.01) | |
| *H01M 4/02* | (2006.01) | |
| *H01M 4/04* | (2006.01) | |
| *H01M 4/131* | (2010.01) | |
| *H01M 4/1315* | (2010.01) | |
| *H01M 4/1391* | (2010.01) | |
| *H01M 4/13915* | (2010.01) | |
| *H01M 4/505* | (2010.01) | |
| *H01M 4/525* | (2010.01) | |
| *H01M 4/58* | (2010.01) | |
| *H01M 4/62* | (2006.01) | |
| *H01M 10/052* | (2010.01) | |
| *H01M 10/0525* | (2010.01) | |

(52) U.S. Cl.
 CPC ....... *H01M 4/525* (2013.01); *H01M 10/0525* (2013.01); *C01P 2006/40* (2013.01); *H01M 2004/028* (2013.01)

(56) References Cited

U.S. PATENT DOCUMENTS

| | | | |
|---|---|---|---|
| 2015/0099181 A1 | 4/2015 | Watanabe et al. | |
| 2016/0336595 A1 | 11/2016 | Choi et al. | |
| 2017/0069907 A1 | 3/2017 | Zhu et al. | |
| 2018/0212233 A1 | 7/2018 | Ito et al. | |
| 2018/0261832 A1* | 9/2018 | Nho .................. | H01M 4/628 |
| 2018/0294477 A1 | 10/2018 | Shin et al. | |
| 2019/0123350 A1 | 4/2019 | Choi et al. | |
| 2019/0165362 A1 | 5/2019 | Baek et al. | |
| 2019/0190019 A1 | 6/2019 | Lee et al. | |
| 2019/0372115 A1 | 12/2019 | Shin et al. | |
| 2020/0020941 A1 | 1/2020 | Mizawa et al. | |
| 2020/0028169 A1* | 1/2020 | Wu .................. | H01M 10/0587 |
| 2020/0274152 A1 | 8/2020 | Nho et al. | |
| 2020/0295367 A1 | 9/2020 | Yoo et al. | |
| 2021/0391571 A1 | 12/2021 | Ahn et al. | |
| 2023/0163295 A1 | 5/2023 | Yoo et al. | |

FOREIGN PATENT DOCUMENTS

| | | | |
|---|---|---|---|
| CN | 108091830 A | 5/2018 | |
| CN | 108140820 A | 6/2018 | |
| CN | 108886142 A | 11/2018 | |
| JP | 2008-016236 A | 1/2008 | |
| JP | 5092292 B2 * | 12/2012 | |
| JP | 2020-520539 A | 7/2020 | |
| JP | 2021015790 A | 2/2021 | |
| KR | 20100042145 A | 4/2010 | |
| KR | 100989901 B1 | 10/2010 | |
| KR | 20150014892 A | 2/2015 | |
| KR | 20170063396 A | 6/2017 | |
| KR | 20170103662 A | 9/2017 | |
| KR | 20170119691 A | 10/2017 | |
| KR | 20180015047 A | 2/2018 | |
| KR | 20180023732 A | 3/2018 | |
| KR | 101892612 B1 | 8/2018 | |
| KR | 20180087102 A | 8/2018 | |
| KR | 20180090211 A | 8/2018 | |
| KR | 20180106773 A | 10/2018 | |
| KR | 20190038395 A | 4/2019 | |
| KR | 20190059241 A | 5/2019 | |
| WO | 2013021955 A1 | 2/2013 | |
| WO | 2015115699 A1 | 8/2015 | |
| WO | 2015132647 A1 | 9/2015 | |
| WO | 2018179936 A1 | 10/2018 | |
| WO | 2019103458 A1 | 5/2019 | |

OTHER PUBLICATIONS

International Search Report for PCT/KR2020/009520 dated Nov. 3, 2020. 2 pgs.
Search Report dated May 16, 2023 from Office Action for Chinese Application No. 202080032833.X issued May 20, 2023. 3 pgs. (see p. 1-2, categorizing the references).

* cited by examiner

METHOD FOR PREPARING POSITIVE ELECTRODE ACTIVE MATERIAL FOR LITHIUM SECONDARY BATTERY AND POSITIVE ELECTRODE ACTIVE MATERIAL PREPARED THEREBY

CROSS-REFERENCE TO RELATED APPLICATIONS

The present application is a national phase entry under 35 U.S.C. § 371 of International Application No. PCT/KR2020/009520, filed on Jul. 20, 2020, which claims priority from Korean Patent Application No. 10-2019-0088560, filed on Jul. 22, 2019, the disclosures of which are incorporated herein by reference.

TECHNICAL FIELD

The present invention relates to a method of preparing a positive electrode active material for a lithium secondary battery, and a positive electrode for a lithium secondary battery including a positive electrode active material prepared by the preparation method and a lithium secondary battery

BACKGROUND ART

As the technical development of and demand for mobile devices increase, the demand for secondary batteries as an energy source is rapidly increasing. Among the secondary batteries, a lithium secondary battery, which exhibits a high energy density and a high voltage, and has a longer cycle life and a low self-discharge rate, has been commercialized and widely used.

Lithium transition metal oxides have been used as a positive electrode active material for a lithium secondary battery, and among these, $LiCoO_2$, which is a lithium cobalt oxide having a high operating voltage and excellent capacity characteristics, has been mainly used. However, $LiCoO_2$ not only has very poor thermal properties due to the destabilization of its crystal structure resulting from lithium deintercalation but also is expensive, and thus, it has a limitation in mass use as a power source in an electric vehicle field and the like.

As an alternative for $LiCoO_2$, a lithium-manganese composite metal oxide ($LiMnO_2$, $LiMn_2O_4$ or the like), a lithium iron phosphate compound ($LiFePO_4$ or the like) or a lithium nickel composite metal oxide ($LiNiO_2$ or the like) was developed. Among these, the research and development of lithium nickel composite metal oxides, which easily implement a high-capacity battery due to a high reversible capacity of approximately 200 mAh/g, are more actively performed. However, $LiNiO_2$ has problems such as poor thermal stability as compared to $LiCoO_2$, and when an internal short circuit occurs in a charged state due to pressure applied from the outside or the like, the positive electrode active material itself is decomposed, causing the battery to rupture and ignite. Accordingly, as a method of improving low thermal stability while retaining an excellent reversible capacity of $LiNiO_2$, $LiNi_{1-\alpha}Co_\alpha O_2 (\alpha=0.1 \text{ to } 0.3)$ in which a part of nickel (Ni) is substituted with cobalt (Co), or a lithium nickel cobalt metal oxide in which a part of Ni is substituted with manganese (Mn), Co, or Al has been developed.

However, in the case of the lithium nickel cobalt metal oxide, there is a problem in that the capacity is low. In order to increase the capacity of the lithium nickel cobalt metal oxide, a method of increasing the content of Ni included in the lithium nickel cobalt metal oxide has been studied, but in this case, a washing process was necessary due to the presence of unreacted residual lithium on a surface of the lithium nickel cobalt metal oxide, and due to the washing process, defects were generated on a surface of a positive electrode active material and thus lifespan characteristics of a battery was deteriorated.

In order to address these problems, conventionally, a method of forming a coating layer on a surface of a positive electrode active material at a low temperature after washing the positive electrode active material has been studied, but the method still had limitations in high-temperature lifespan characteristics and high-temperature resistance characteristics.

Accordingly, there is a need for the development of a positive electrode active material which not only has high capacity characteristics but also has improved high-temperature lifespan characteristics and high-temperature resistance characteristics.

DISCLOSURE

Technical Problem

In order to solve the above problems, a first objective of the present invention is directed to providing a method of preparing a positive electrode active material, capable of uniformly forming a coating layer on a surface thereof.

A second objective of the present invention is directed to providing a positive electrode active material exhibiting improved high-temperature lifespan characteristics and high-temperature resistance characteristics by being prepared by the above preparation method and thus including a coating layer uniformly formed on a surface thereof.

A third objective of the present invention is directed to providing a positive electrode including the positive electrode active material.

A fourth objective of the present invention is directed to providing a lithium secondary battery exhibiting improved capacity and resistance characteristics by including the positive electrode.

Technical Solution

One aspect of the present invention provides a method of preparing a positive electrode active material including forming a first coating layer on a surface of a lithium transition metal oxide represented by Formula 1 below using a basic aqueous solution containing a coating element $M^1$ (where $M^1$ includes at least one selected from sodium (Na) and aluminum (Al)), and forming a second coating layer by dry-mixing the lithium transition metal oxide, on which the first coating layer is formed, and a raw material containing a coating element $M^2$ (where $M^2$ includes boron (B)) and performing heat treatment on the mixture,

[Formula 1]

wherein, in Formula 1, 1.03≤a≤1.12, 0.7≤b<1.0, 0<c≤0.3, 0<d≤0.3, 0<e≤0.1, and 0≤f≤0.1, and X includes at least one selected from the group consisting of zirconium (Zr), B, tungsten (W), magnesium (Mg), cerium (Ce), hafnium (Hf), tantalum (Ta), titanium (Ti), strontium (Sr), barium (Ba), fluorine (F), phosphorus (P), sulfur (S), and lanthanum (La).

Another aspect of the present invention provides a positive electrode active material including a lithium transition metal oxide represented by Formula 2 below, a first coating layer, which includes a coating element $M^1$ (where $M^1$ includes at least one selected from sodium (Na) and aluminum (Al)), formed on a surface of the lithium transition metal oxide, and a second coating layer, which includes a coating element $M^2$ (where $M^2$ includes boron (B)), formed on the surface of the lithium transition metal oxide, $$Li_{a1}Ni_{b1}Co_{c1}Mn_{d1}Al_{e1}X_{f1}O_2 \quad \text{[Formula 2]}$$

wherein, in Formula 2,
$1.03 \le a1 \le 1.12$, $0.7 \le b1 < 1.0$, $0 < c1 \le 0.3$, $0 < d1 \le 0.3$, $0 < e1 \le 0.1$, and $0 < f1 < 0.1$, and X includes at least one selected from the group consisting of Zr, B, W, Mg, Ce, Hf, Ta, Ti, Sr, Ba, F, P, S, and La.

Still another aspect of the present invention provides a positive electrode for a lithium secondary battery, which includes the positive electrode active material.

Yet another aspect of the present invention provides a lithium secondary battery including the positive electrode.

Advantageous Effects

According to the present invention, high-temperature lifespan characteristics and high-temperature resistance characteristics can be improved by forming a first coating layer on a surface of a positive electrode active material having a high nickel content using a basic aqueous solution, which includes a coating element $M^1$ (where $M^1$ includes at least one from sodium (Na) and aluminum (Al)), and forming a second coating layer including a coating element $M^2$ (where $M^2$ includes boron (B)).

MODE FOR INVENTION

Hereinafter, the present invention will be described in further detail.

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

The terms used in the present specification are only used to describe specific various embodiments and are not intended to limit the present invention. As used herein, singular forms are intended to include plural forms as well, unless the context clearly indicates otherwise.

It should be understood that the terms "comprises," "comprising," "includes," "including," "contains," "including,"
"has," and/or "having," when used herein, specify the presence of stated features, integers, steps, operations, elements, components and/or combinations thereof, but do not preclude the presence or addition of one or more other features, integers, steps, operations, elements, components and/or combinations thereof.

In the present specification, "%" represents weight percentages unless otherwise indicated.

In the present specification, when a component is referred to as "on" another component, this includes not only a case in which the component is formed directly on a surface of another component, but also a case in which still another component is interposed between these components.

Method of Preparing Positive Electrode Active Material

Hereinafter, a method of preparing a positive electrode active material according to the present invention will be described in detail.

The method of preparing the positive electrode active material according to the present invention includes forming a first coating layer on a surface of a lithium transition metal oxide represented by Formula 1 below by using a basic aqueous solution, which includes a coating element $M^1$ (where $M^1$ includes at least one selected from sodium (Na) and aluminum (Al)), and forming a second coating layer by dry-mixing the lithium transition metal oxide, on which the first coating layer is formed, and a raw material containing a coating element $M^2$ (where $M^2$ includes boron (B)) and performing heat treatment on the mixture, $$Li_aNi_bCo_cMn_dAl_eX_fO_2 \quad \text{[Formula 1]}$$

wherein, in Formula 1,
$1.03 \le a \le 1.12$, $0.7 < b \le 1.0$, $0 < c \le 0.3$, $0 < d \le 0.3$, $0 < e \le 0.1$, and $0 \le f \le 0.1$, and X includes at least one selected from the group consisting of zirconium (Zr), B, tungsten (W), magnesium (Mg), cerium (Ce), hafnium (Hf), tantalum (Ta), titanium (Ti), strontium (Sr), barium (Ba), fluorine (F), phosphorus (P), sulfur (S), and lanthanum (La).

Preferably, the lithium transition metal oxide may be represented by Formula 1, and more preferably, $1.03 \le a \le 1.12$, $0.75 \le b \le 0.95$, $0.05 \le c \le 0.25$, $0 < d \le 0.1$, $0 < e \le 0.05$, and $0 \le f \le 0.05$, and X may include at least one selected from the group consisting of Zr, B, W, Mg, Ce, Hf, Ta, Ti, Sr, Ba, F, P, S, and La.

Hereinafter, each process will be described in more detail.

Formation of First Coating Layer

The present invention includes forming a first coating layer on a surface of a lithium transition metal oxide represented by Formula 1 by using a basic aqueous solution including a coating element $M^1$ (where $M^1$ includes at least one selected from Na and Al).

According to the present invention, the first coating layer is formed by using the basic aqueous solution including the coating element $M^1$ (where $M^1$ includes at least one selected from Na and Al), and the coating layer is uniformly formed on a surface of a resulting positive electrode active material, so that high-temperature lifespan characteristics and high-temperature resistance characteristics of a secondary battery including the positive electrode active material may be improved.

Further, in the case of using a wet coating method when forming the first coating layer as in the present invention, the coating layer may be formed with a uniform thickness on a surface of a lithium transition metal oxide, unlike the case of using a dry coating method in which a coating layer is formed in the form of an island.

The basic aqueous solution including the coating element $M^1$ (where $M^1$ includes at least one selected from Na and Al) may be used in an amount of 0.01 to 10 parts by weight, and preferably, 0.05 to 5 parts by weight with respect to 100 parts by weight of the lithium transition metal oxide. In this case, when the positive electrode active material, which is prepared by uniformly coating the first coating layer on the surface of the lithium transition metal oxide, is applied to a battery, lifespan characteristics and resistance characteristics of the battery may be improved.

The basic aqueous solution including the coating element $M^1$ (where $M^1$ includes at least one selected from Na and Al) may be used as a washing solution or an aqueous solution for forming the first coating layer.

The basic aqueous solution including the coating element $M^1$ (where $M^1$ includes at least one selected from Na and Al) may include at least one selected from the group consisting of LiOH, KOH, NaOH, $Ba(OH)_2$, $Na_2CO_3$, NaCl, $CH_3COONa$, $Na_2SO_4$, $NaNO_2$, $NH_4OH$, $CH_3CO_2NH_4$, $(NH_4)_2SO_4$, $NH_4NO_3$, $(NH_{14})_2HPO_4$, $P_2O_5$, $H_3PO_4$, $H_3BO_3$, HF, HCl, $HNO_3$, $H_2O_2$, $Mg(OH)_2$, $Ca(OH)_2$, $Al_2O_3$, $Al(OH)_3$, $AlF_3$, $AlBr_3$, $AlPO_4$, $AlCl_3$, $Al(NO)_3$, $Al(NO_3)_3 \cdot 9H_2O$, $Al_2(SO_4)_3 \cdot H_2O$, $Al(H_2PO_4)_3$, $C_2H_5O_4Al$, $Al(SO)_4$, $NaAlO_2$, $Al_2CoO_4$, $LaAlO_3$, and $MgAl_2O_4$.

According to the present invention, the forming of the first coating layer may include washing the lithium transition metal oxide represented by Formula 1 by mixing the lithium transition metal oxide with a washing solution, separating the lithium transition metal oxide from the washing solution, and mixing the lithium transition metal oxide with an aqueous solution for forming the first coating layer, which is the basic aqueous solution including the coating element $M^1$ (where $M^1$ includes at least one selected from Na and Al) and then drying the mixture. In this case, the first coating layer having a more uniform composition and thickness may be formed on the surface of the lithium transition metal oxide. In this case, the washing solution may be distilled water.

Alternatively, according to the present invention, the forming of the first coating layer may include mixing the lithium transition metal oxide represented by Formula 1 with a washing solution, which is the basic aqueous solution including the coating element $M^1$ (where $M^1$ includes at least one selected from Na and Al), and washing the mixture, and separating the lithium transition metal oxide from the washing solution and then drying the lithium transition metal oxide. In this case, even when a separate coating process is not performed, a coating material may be attached to the surface of the lithium transition metal oxide to form the first coating layer, and thus it is advantageous in terms of process simplification.

According to the present invention, the washing solution may be mixed in an amount of 60 parts by weight or more and 200 parts by weight or less, preferably 60 parts by weight or more and 150 parts by weight or less, and more preferably 80 parts by weight or more and 120 parts by weight or less with respect to 100 parts by weight of the lithium transition metal oxide. When the lithium transition metal oxide and the washing solution are mixed at the contents described above, residual lithium present on the surface of the lithium transition metal oxide may be easily removed. When the content of the washing solution with respect to the lithium transition metal oxide is less than the above-described range, the content of the residual lithium present on the surface of the lithium transition metal oxide may be increased, and thus gas may be generated when the lithium transition metal oxide is applied to a battery. In contrast, when the content of the washing solution with respect to the lithium transition metal oxide is greater than the above-described range, the surface of the lithium transition metal oxide may be damaged, and thus, when the lithium transition metal oxide is applied to a battery, lifespan may be reduced and a resistance increase rate may be increased.

A solvent of the washing solution may be at least one selected from water and ethanol, but the present invention is not limited thereto. The solvent of the washing solution may be preferably distilled water, and in this case, it is possible to sufficiently dissolve lithium by-products at room temperature, thereby more easily removing the lithium by-products present on the surface of the lithium transition metal oxide.

According to the present invention, the separating of the lithium transition metal oxide from the washing solution may be an operation performed such that the lithium transition metal oxide separated from the washing solution has a moisture content of 3% and 15%. Preferably, the operation may be performed such that the lithium transition metal oxide has a moisture content of 5% to 12%, and more preferably 5% to 7%.

Here, the moisture content refers to the content of moisture included in the lithium transition metal oxide before drying after being separated from the washing solution, and may be calculated according to Equation 1 below, Moisture content (%)={[(mass of lithium transition metal oxide before drying)−(mass of lithium transition metal oxide after drying)]/(mass of lithium transition metal oxide before drying)}× 100   [Equation 1]

Here, the drying may be an operation of drying the lithium transition metal oxide separated from the washing solution at 130° C. for 300 minutes.

When the moisture content is within the above-described range, a surface state, that is, surface physical properties may be controlled so that the first coating layer having a uniform composition and thickness may be easily coated on the surface of the lithium transition metal oxide.

The separation may be performed using a decompression filter having an average pore size of 1 to 50 In this case, the lithium transition metal oxide may be separated from the washing solution in a short time.

The drying may be performed at 50° C. to 300° C. for 5 minutes to 1,200 minutes, and preferably 80° C. to 150° C. for 10 minutes to 300 minutes. The drying may be performed using a hot air injection method, a vacuum drying method, or the like.

Meanwhile, a commercially available positive electrode active material may be purchased and used for the lithium transition metal oxide, or the lithium transition metal oxide may be prepared according to a well-known method of preparing a positive electrode active material.

For example, when the lithium transition metal oxide according to the present invention is prepared, nickel-cobalt-manganese-aluminum hydroxide is formed by a coprecipitation reaction of a nickel raw material, a cobalt raw material, a manganese raw material, and an aluminum raw material, and then the nickel-cobalt-manganese-aluminum hydroxide is mixed with a lithium raw material, and the mixture is sintered to prepare lithium-nickel-cobalt-manganese-aluminum oxide according to the present invention.

Alternatively, the lithium-nickel-cobalt-manganese-aluminum oxide may be formed by adding Al as a doping element. The lithium-nickel-cobalt-manganese-aluminum oxide according to the present invention may be prepared, for example, by operations of: forming nickel-cobalt-manganese-aluminum oxide by forming nickel-cobalt-manganese hydroxide by a coprecipitation reaction of a nickel raw material, a cobalt raw material, and a manganese raw material, and then mixing the nickel-cobalt-manganese hydroxide with an aluminum raw material and performing heat treatment on the mixture; and mixing the nickel-cobalt-manganese-aluminum oxide with a lithium raw material and firing the mixture.

Alternatively, the lithium transition metal oxide according to the present invention may be the lithium-nickel-cobalt-manganese-aluminum oxide according to the present invention prepared by simultaneously mixing nickel-cobalt-manganese hydroxide, an excessive amount of aluminum raw material, and a lithium raw material and firing the mixture.

In the case of the lithium-nickel-cobalt-manganese-aluminum oxide, since aluminum is added in excess during the coprecipitation reaction, aluminum may be relatively more distributed on a surface of particles, and accordingly, when the nickel-cobalt-manganese-aluminum oxide is mixed with a lithium raw material, lithium aluminum oxide (Li—Al—O) may be further formed on a surface of the lithium-nickel-cobalt-manganese-aluminum oxide due to a reaction of aluminum and lithium.

The ratio (Li/Me) of lithium and transition metals included in the lithium transition metal oxide is in a range of 1.03 to 1.12, preferably 1.04 to 1.10, and most preferably 1.08 to 1.10, that is, lithium is included in a relatively excessive amount compared to transition metals, so that the surface of the lithium transition metal oxide includes an excessive amount of lithium by-products. The excess lithium by-products may react with a coating material to form a lithium metal oxide solid solution in a subsequent process of forming the first coating layer and/or the second coating layer, so that problems such as a side reaction with an electrolyte solution and the expansion of a battery due to the presence of the excess lithium by-products may be solved.

When the lithium transition metal oxide includes a doping element X, the doping element X may be introduced during a coprecipitation reaction of a positive electrode active material precursor, or introduced during an operation of mixing a positive electrode active material precursor and a lithium raw material and firing the mixture.

Formation of Second Coating Layer

Subsequently, the present invention includes forming a second coating layer by dry-mixing the lithium transition metal oxide, on which the first coating layer formed, and a raw material containing a coating element $M^2$ (where $M^2$ includes B) and performing heat treatment on the mixture.

The first coating layer may be formed on a surface of the lithium transition metal oxide, and the second coating layer may be formed on a surface of the first coating layer.

When the lithium transition metal oxide, on which the first coating layer is formed, and the raw material containing the coating element $M^2$ (where $M^2$ includes B) are dry-mixed and heat-treated, the second coating layer including the coating element $M^2$ (where $M^2$ includes B) may be formed on the surface of the first coating layer. In more detail, the lithium by-products, which are still present on the surface of the lithium transition metal oxide on which the first coating layer is formed, and the raw material containing the coating element $M^2$ are reacted to form a Li—B—O solid solution, thereby forming the second coating layer. Meanwhile, when the Li—B—O solid solution is formed, a side reaction between a positive electrode active material and an electrolyte solution may be more effectively suppressed.

Alternatively, the first coating layer and the second coating layer may be mixed on the surface of the lithium transition metal oxide to form a mixed coating layer. The mixed coating layer may include a Li-$M^1$-$M^2$-O solid solution (where $M^1$ includes at least one selected from Na and Al, and $M^2$ includes B).

When the lithium transition metal oxide, on which the first coating layer is formed, and the raw material containing the coating element $M^2$ (where $M^2$ includes B) are dry-mixed and heat-treated, the second coating layer including the coating element $M^2$ (where $M^2$ includes B) may be formed on the surface of the lithium transition metal oxide. In this case, the second coating layer may include the Li-$M^1$-$M^2$-O solid solution (where $M^1$ includes at least one selected from Na and Al, and $M^2$ includes B). This is because the first coating layer and the raw material containing the coating element $M^2$ (where $M^2$ includes B) may be reacted while the lithium transition metal oxide, on which the first coating layer is formed, and the raw material containing the coating element $M^2$ (where $M^2$ includes B) are dry-mixed and heat-treated to form the Li-$M^1$-$M^2$-O solid solution. Specifically, the lithium by-products, which are still present on the surface of the lithium transition metal oxide on which the first coating layer is formed, $M^1$ that is present in the first coating layer, and the raw material containing the coating element $M^2$ are reacted to form the second coating layer including the Li-$M^1$-$M^2$-O solid solution on the surface of the lithium transition metal oxide. Even in this case, a side reaction between a positive electrode active material and an electrolyte solution may be more effectively suppressed.

Specifically, the raw material containing the coating element $M^2$ is dry-mixed in an amount of 0.1 to 3 parts by weight, more preferably 0.1 to 1.5 parts by weight, and most preferably 0.2 to 1 part by weight with respect to 100 parts by weight of the lithium transition metal oxide, on which the first coating layer is formed, and heat-treated, so that the second coating layer including the coating element $M^2$ may be formed on the surface of the first coating layer or the surface of the lithium transition metal oxide. When the content of the raw material containing the coating element $M^2$ with respect to 100 parts by weight of the lithium transition metal oxide is within the above-described range, the second coating layer including the coating element $M^2$ may be easily formed on the surface of the first coating layer or the surface of the lithium transition metal oxide.

As the raw material containing the coating element $M^2$, at least one selected from, for example, an acetate, a nitrate, a sulfate, a halide, sulfide, a hydroxide, an oxide, and an oxyhydroxide, each of which contains the coating element $M^2$, may be used, and preferably, an oxide containing the coating element $M^2$ may be used. The raw material containing the coating element $M^2$ may preferably be boric acid, a borate, or boron oxide.

The raw material containing the coating element $M^2$ may be, more preferably, at least one selected from the group consisting of $H_3BO_3$, $B_2H_4O_4$, and $B_2O_3$.

Further, according to the present invention, the heat treatment may be performed at a low temperature of 200° C. to 500° C., and preferably, 240° C. to 380° C. In this case, a coating layer may be uniformly formed on the lithium transition metal oxide, and thus, when the lithium transition metal oxide is applied to a battery, lifespan characteristics of the battery may be improved. For example, when the heat treatment temperature is less than a lower limit of the above-described range, the reactivity of the coating element $M^2$ is low, so that the raw material containing the coating element $M^2$ remains on the surface of the lithium transition metal oxide and thus may rather act as resistance. When the heat treatment temperature is greater than an upper limit of the above-described range, lithium present on the surface of the lithium transition metal oxide and the coating element $M^2$ react excessively, so that a large amount of lithium may be present in the coating layer.

Positive Electrode Active Material

Further, the positive electrode active material according to the present invention includes a lithium transition metal oxide represented by Formula 2 below, a first coating layer including a coating element $M^1$ (where $M^1$ includes at least one selected from Na and Al) formed on a surface of the lithium transition metal oxide and a second coating layer, which includes a coating element $M^2$ (where $M^2$ includes B), formed on a surface of the first coating layer.

Further, the positive electrode active material according to the present invention includes a lithium transition metal oxide represented by Formula 2 below, and a second coating layer, which includes a coating element $M^2$ (where $M^2$ includes B), formed on a surface of the lithium transition metal oxide, and the second coating layer includes a Li-$M^1$-$M^2$-O solid solution (where $M^1$ includes at least one selected from Na and Al, and $M^2$ includes B), $$Li_{a1}Ni_{b1}Co_{c1}Mn_{d1}Al_{e1}X_{f1}O_2 \qquad \text{[Formula 2]}$$

wherein, in Formula 2,
1.03≤a1≤1.12, 0.7≤b1<1.0, 0<c1≤0.3, 0<d1≤0.3, 0<e1≤0.1, and 0≤f1≤0.1, and X includes at least one selected from the group consisting of Zr, B, W, Mg, Ce, Hf, Ta, Ti, Sr, Ba, F, P, S, and La.

The positive electrode active material is prepared by the preparation method described above and thus includes a coating layer uniformly formed thereon, so that high-temperature lifespan characteristics and high-temperature resistance characteristics of a secondary battery including the positive electrode active material may be improved.

In particular, in the case that $M^1$ includes both Na and Al at the same time, it is possible to achieve an effect of preventing the deterioration of lifespan characteristics and suppressing an increase in resistance when the positive electrode active material according to the present invention is applied to a battery.

According to the present invention, when $M^1$ includes Al, in a time-of-flight secondary ion mass analysis spectrum of the positive electrode active material, the ratio of the intensity of a peak detected at a mass exceeding 27 and a mass of 27.5 or less and the intensity of a peak of $Al^+$ may be 1:0.5 to 1:2, preferably, 1:1 to 1:2, and more preferably, 1:1 to 1:1.5. The peak detected at the mass exceeding 27 and the mass of 27.5 or less is a peak of $C_2H_3^+$ and is a base peak. In this case, cycle characteristics of a battery to which the positive electrode active material according to the present invention is applied may be improved. In particular, in the battery, high-temperature lifespan characteristics may be improved and a resistance increase rate at a high temperature may be suppressed.

The first coating layer may include at least one selected from the group consisting of $Na_2O$, $Al_2O_3$, $NaAlO_2$, $Na_3BO_3$, $AlBO_3$, and $NaAlB_2O_5$. In addition, the first coating layer may include a Li—Na—O solid solution, a Li—Al—O solid solution, or a Li—Na—Al—O solid solution, which is formed by a reaction with lithium by-products remaining on the surface of the lithium transition metal oxide. For example, the first coating layer may include $Li_{0.5}Na_{0.5}AlO_2$. In addition, the first coating layer may include the coating element $M^1$ and may further include the coating element $M^2$ diffused from the second coating layer.

For example, the first coating layer may include a Li—Na—Al—B—O solid solution. The first coating layer is formed through a wet process and includes the above-described compound, so that coating may be enhanced and high-temperature lifespan characteristics and long-term reliability of a battery including the positive electrode active material according to the present invention may be improved.

The second coating layer may include a B—O solid solution. In addition, the second coating layer may include a Li—B—O solid solution, a Na—Li—B—O solid solution, a Li—B—Al—O solid solution, or a Na—B—Al—O solid solution, which is formed by a reaction with residual lithium by-products and/or the coating element $M^1$ diffused from the first coating layer, and preferably, may include $Li_{0.5}Na_{0.5}BO_2$. The second coating layer according to the present invention may be formed through a dry process and include the above-described compound, and thus, when the second coating layer is applied to a battery, lifespan characteristics and resistance characteristics of the battery may be further improved.

The Li-$M^1$-$M^2$-O solid solution may be, preferably, at least one selected from the group consisting of a Na—Li—B—O solid solution, a Li—B—Al—O solid solution, and a Li—Na—Al—B—O solid solution, and more preferably, may be a Li—Na—Al—B—O solid solution. The positive electrode active material according to the present invention includes the Li-$M^1$-$M^2$-O solid solution, so that, when the positive electrode active material is applied to a battery, lifespan characteristics and resistance characteristics of the battery may be further improved.

The coating element $M^1$ may be included in an amount of 50 ppm to 10,000 ppm, preferably, 50 ppm to 8,000 ppm, and more preferably, 200 ppm to 7,000 ppm with respect to the total weight of the positive electrode active material. When the coating element $M^1$ is included in the positive electrode active material at the content described above, a coating layer may be uniformly formed, and when the positive electrode active material is applied to a battery, lifespan characteristics and resistance characteristics of the battery may be improved.

The coating element $M^2$ may be included in an amount of 100 ppm to 2,000 ppm, preferably, 200 ppm to 1,800 ppm, and more preferably, 500 ppm to 1,500 ppm with respect to the total weight of the positive electrode active material. When the coating element $M^2$ is included in the positive electrode active material at the content described above, a coating layer may be uniformly formed, so that a performance improvement effect may be achieved due to the uniform formation of the coating layer.

When the positive electrode active material according to the present invention includes the first coating layer and the second coating layer that are described above, limitations of the high-temperature lifespan characteristics and resistance characteristics may be minimized, so that high capacity may be achieved and also high-temperature lifespan characteristics and high-temperature storage characteristics may be improved, and as a result, a battery with improved long-term reliability may be manufactured.

Positive Electrode

Further, the present invention provides a positive electrode for a lithium secondary battery, which includes the positive electrode active material. Specifically, the positive electrode for a lithium secondary battery includes a positive electrode current collector, and a positive electrode active material layer formed on the positive electrode current collector, and the positive electrode active material layer includes the positive electrode active material according to the present invention.

Here, the positive electrode active material is the same as described above, and thus a detailed description thereof will be omitted, and hereinafter, only the remaining components will be described in detail.

The positive electrode current collector is not particularly limited as long as it does not cause a chemical change in the battery and has conductivity and may be, for example, stainless steel, aluminum, nickel, titanium, calcined carbon, or aluminum or stainless steel whose surface is treated with carbon, nickel, titanium, silver, or the like. In addition, the positive electrode current collector may generally have a thickness of 3 μm to 500 μm, and fine irregularities may be formed on the surface of the current collector to increase the adhesion of the positive electrode active material. For example, the positive electrode current collector may be used in various forms such as a film, a sheet, a foil, a net, a porous body, a foam, a nonwoven fabric, and the like.

The positive electrode active material layer may include a conductive material and selectively a binder as needed in addition to the positive electrode active material.

Here, the positive electrode active material may be included at a content of 80 to 99 wt %, and more specifically 85 to 98.5 wt % with respect to the total weight of the positive electrode active material layer. When the negative electrode active material is included in the above-described content range, excellent capacity characteristics may be exhibited.

The conductive material is used to impart conductivity to an electrode, and thus any one that has electronic conductivity without causing a chemical change in the battery can be used without particular limitation. Specific examples thereof may include: graphite such as natural or artificial graphite; a carbon-based material such as carbon black, acetylene black, Ketjen black, channel black, furnace black, lamp black, thermal black, or carbon fiber; a metal powder or metal fiber formed of copper, nickel, aluminum or silver; a conductive whisker such as zinc oxide or potassium titanate; a conductive metal oxide such as titanium oxide; or a conductive polymer such as a polyphenylene derivative, which may be used alone or in a mixture of two or more thereof. The conductive material may be included in an amount of 0.1 to 15 wt % with respect to the total weight of the positive electrode active material layer.

The binder serves to improve the adhesion between positive electrode active material particles and the adhesion between the positive electrode active material and a current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinyl pyrrolidone, tetrafluoroethylene, polyethylene, polypropylene, an ethylene propylene diene polymer (EPDM), a sulfonated EPDM, styrene butadiene rubber (SBR), a fluororubber, various copolymers thereof and the like, which may be used alone or in a mixture of two or more thereof. The binder may be included in an amount of 0.1 to 15 wt % with respect to the total weight of the positive electrode active material layer.

The positive electrode may be manufactured according to a conventional method of preparing a positive electrode, except that the above-described positive electrode active material is used. Specifically, the positive electrode may be manufactured by applying a composition for forming a positive electrode active material layer, which is prepared by dissolving or dispersing the above-described positive electrode active material and, selectively, a binder and a conductive material in a solvent, on a positive electrode current collector, and then performing drying and rolling.

The solvent may be a solvent generally used in the art, and examples thereof include dimethyl sulfoxide (DMSO), isopropyl alcohol, N-methylpyrrolidone (NMP), acetone, water, or the like, which may be used alone or in a mixture of two or more thereof. The amount of the solvent to be used may be suitably adjusted in consideration of coating thickness of a slurry and production yield to be enough to dissolve or disperse the positive electrode active material, the conductive material, and the binder, and have a viscosity capable of exhibiting excellent thickness uniformity when coated to manufacture the positive electrode.

Further, as another method, the positive electrode may be manufactured by casting the composition for forming a positive electrode active material layer on a separate support and then laminating a film peeled from the support on the positive electrode current collector.

Lithium Secondary Battery

Further, according to the present invention, an electrochemical device including the positive electrode may be manufactured. Specifically, the electrochemical device may be a battery, a capacitor, or the like, and more specifically, may be a lithium secondary battery.

Specifically, the lithium secondary battery includes a positive electrode, a negative electrode positioned opposite to the positive electrode, a separator interposed between the positive electrode and the negative electrode, and an electrolyte. Here, the positive electrode is the same as described above and thus a detailed description thereof will be omitted, and hereinafter, only the remaining components will be described in detail.

Further, the lithium secondary battery may selectively further include a battery case accommodating an electrode assembly of the positive electrode, the negative electrode, and the separator, and a sealing member sealing the battery case.

In the lithium secondary battery, the negative electrode includes a negative electrode current collector and a negative electrode active material layer positioned on the negative electrode current collector.

The negative electrode current collector is not particularly limited as long as it has high conductivity without causing a chemical change in a battery, and may be, for example, copper, stainless steel, aluminum, nickel, titanium, calcined carbon, copper or stainless steel whose surface is treated with carbon, nickel, titanium or silver, or an aluminum-cadmium alloy. In addition, the negative electrode current collector may generally have a thickness of 3 μm to 500 μm, and like the positive electrode current collector, fine irregularities may be formed on a surface of the current collector to increase the binding force of the negative electrode active material. For example, the negative electrode current collector may be used in various forms such as a film, a sheet, a foil, a net, a porous body, a foam, a non-woven fabric, and the like.

The negative electrode active material layer selectively includes a binder and a conductive material in addition to the negative electrode active material.

As the negative electrode active material, a compound enabling reversible intercalation and deintercalation of lithium may be used. Specific examples thereof may include carbonaceous materials such as artificial graphite, natural graphite, graphitized carbon fiber, and amorphous carbon;

metallic compounds capable of alloying with lithium such as Si, Al, Sn, Pb, Zn, Bi, In, Mg, Ga, Cd, Si alloys, Sn alloys or Al alloys; metal oxides capable of doping and dedoping lithium such as $SiO_\beta$ (0<β<2), $SnO_2$, vanadium oxides, and lithium vanadium oxides; or composites including the metallic compound and the carbonaceous compound such as Si—C composites or Sn—C composites, which may be used alone or in a mixture of two or more thereof. In addition, as the negative electrode active material, a metal lithium thin film may be used. In addition, both low-crystalline carbon and high-crystalline carbon may be used as a carbon material. Representative examples of the low-crystalline carbon include soft carbon and hard carbon, and representative examples of the high-crystalline carbon include high-temperature calcined carbon such as amorphous, sheet-type, flake-type, spherical or fiber-type natural or artificial graphite, Kish graphite, pyrolytic carbon, mesophase pitch-based carbon fiber, meso-carbon microbeads, mesophase pitches, and petroleum or coal tar pitch derived cokes.

The negative electrode active material may be included in an amount of 80 wt % to 99 wt % based on the total weight of the negative electrode active material layer.

The binder is a component that assists bonding between a conductive material, an active material, and a current collector, and may be typically added in an amount of 0.1 wt % to 10 wt % based on the total weight of the negative electrode active material layer. Examples of such a binder include PVDF, polyvinyl alcohol, CMC, starch, hydroxypropyl cellulose, regenerated cellulose, polyvinylpyrrolidone, tetrafluoroethylene, polyethylene, polypropylene, an EPDM, a sulfonated-EPDM, styrene-butadiene rubber, nitrile-butadiene rubber, fluororubber, various copolymers thereof, and the like.

The conductive material is a component for further enhancing the conductivity of the negative electrode active material, and may be added in an amount of 10 wt % or less, and preferably, 5 wt % or less based on the total weight of the negative electrode active material layer. The conductive material is not particularly limited as long as it does not cause a chemical change in a battery, and has conductivity, and may be, for example: graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorocarbon powder, aluminum powder, or nickel powder; a conductive whisker such as zinc oxide or potassium titanate; a conductive metal oxide such as titanium oxide; or a conductive material such as a polyphenylene derivative.

For example, the negative electrode active material layer may be prepared by applying a composition for forming a negative electrode active material layer, which is prepared by dissolving or dispersing a negative electrode active material and, selectively, a binder and a conductive material in a solvent, on a negative electrode current collector and then performing drying, or may be prepared by laminating a film, which is prepared by casting the composition for forming a negative electrode active material layer on a separate support and then peeling it from the support, on a negative electrode current collector.

As an example, the negative electrode active material layer may be prepared by applying a composition for forming a negative electrode active material layer, which is prepared by dissolving or dispersing a negative electrode active material and, selectively, a binder and a conductive material in a solvent, on a negative electrode current collector and then performing drying, or by laminating a film, which is prepared by casting the composition for forming a negative electrode active material layer on a separate support and then peeling it from the support, on a negative electrode current collector.

Meanwhile, in the lithium secondary battery, the separator is not particularly limited as long as it is generally used in a lithium secondary battery to separate a negative electrode from a positive electrode and provide a movement path for lithium ions, and particularly, it is preferred that the separator have low resistance to ion migration of an electrolyte and an excellent ability to impregnate an electrolyte solution. Specifically, a porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, or a stacked structure having two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to secure thermal resistance or mechanical strength, and may be selectively used in a single- or multi-layered structure.

Further, as the electrolyte used in the present invention, an organic liquid electrolyte, an inorganic liquid electrolyte, a solid polymer electrolyte, a gel-type polymer electrolyte, a solid inorganic electrolyte, or a molten inorganic electrolyte, which may be used in manufacturing a lithium secondary battery, may be used, but the present invention is not limited thereto.

Specifically, the electrolyte may include an organic solvent and a lithium salt.

The organic solvent is not specifically limited so long as it functions as a medium through which ions involved in an electrochemical reaction of a battery can move. Specifically, the organic solvent may be ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as R—CN (R is a straight, branched, or cyclic hydrocarbon group of C2 to C20, and may include a double-bonded aromatic ring or an ether bond); amides such as dimethylformamide; dioxolanes such as 1,3-dioxolane; sulfolanes; and the like. Among these, a carbonate-based solvent is preferably used, and a mixture of a cyclic carbonate having high ionic conductivity and a high dielectric constant, such as ethylene carbonate or propylene carbonate, which can increase the charge and discharge performance of the battery, and a linear carbonate-based compound with low viscosity (for example, ethyl methyl carbonate, dimethyl carbonate, diethyl carbonate, or the like) is more preferably used. In this case, when a cyclic carbonate and a chain-type carbonate are mixed in a volume ratio of about 1:1 to about 1:9, the electrolyte solution may exhibit excellent performance.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, LiN(CF$_3$SO$_2$)$_2$, LiCl, LiI, LiB(C$_2$O$_4$)$_2$, or the like may be used as the lithium salt. The concentration of the lithium salt is preferably in a range of 0.1 to 2.0M. When the concentration of the lithium salt is in the above-described range, the electrolyte has suitable conductivity and viscosity and thus may exhibit excellent electrolyte performance, and the lithium ions may effectively move.

In addition to the above-described components of the electrolyte, one or more additives such as a haloalkylene carbonate-based compound such as difluoroethylene carbonate, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinones, N,N-substituted imidazolidines, ethylene glycol dialkyl ethers, ammonium salts, pyrrole, 2-methoxyethanol, aluminum trichloride, or the like may be added to the electrolyte for the purpose of improving the lifespan characteristics of the battery, suppressing a reduction in battery capacity, and improving the discharge capacity of the battery. Here, the additive may be included in an amount of 0.1 to 5 wt % with respect to the total weight of the electrolyte.

As described above, since the lithium secondary battery including the positive electrode active material according to the present invention stably exhibits excellent discharge capacity, excellent output characteristics, and excellent lifespan characteristics, it may be useful in the field of portable devices such as mobile phones, notebook computers and digital cameras, and the field of electric vehicles such as hybrid electric vehicles (HEVs), and the like.

Thus, according to another embodiment of the present invention, a battery module including the lithium secondary battery as a unit cell, and a battery pack including the battery module are provided.

The battery module or the battery pack may be used as a power supply of a medium- to large-sized device of any one or more of power tools; electric vehicles including electric vehicles (EVs), hybrid electric vehicles and plug-in hybrid electric vehicles (PHEVs); or systems for power storage.

The exterior of the lithium secondary battery of the present invention is not particularly limited, but may have a cylindrical shape using a can, a prismatic shape, a pouch shape, or a coin shape.

The lithium secondary battery according to the present invention may not only be used in a battery cell used as a power source for small devices, but may also be used as a unit battery in medium- to large-sized battery modules including a plurality of battery cells.

Hereinafter, the present invention will be described in further detail with reference to the following examples. However, the examples according to the present invention can be modified into many different forms, and the scope of the present invention should not be construed as being limited to the examples described below. The examples of the present invention are provided to more completely explain the present invention to those of ordinary skill in the art.

EXAMPLES

Example 1

As a positive electrode active material precursor, core particles represented by Li$_{1.08}$Ni$_{0.86}$Co$_{0.05}$Mn$_{0.07}$Al$_{0.02}$O$_2$ were prepared by mixing LiOH·H$_2$O, Ni$_{0.88}$Co$_{0.05}$Mn$_{0.07}$(OH)$_2$, and Al(OH)$_3$, such that a molar ratio of Li:transition metal:Al became 1.08:0.98:0.02 and firing the mixture at 780° C. for 12 hours.

Subsequently, distilled water and the core particles prepared above were mixed at a weight ratio of 1:1 (mass ratio of 140 g:140 g) and washed for 5 minutes. Thereafter, the washed product was subjected to separation filter treatment to have a moisture content of 5 to 7%, mixed with a coating solution in which 0.028 g of NaOH and 0.255 g of NaAlO$_2$ were dissolved in 14 g of distilled water, and then dried at 130° C. Subsequently, the dried product from above was mixed with H$_3$BO$_3$ at a weight ratio of 100:0.57 and heat-treated at 300° C. for 8 hours to prepare a positive electrode active material coated with a Li—Na—Al—B—O solid solution.

Example 2

A basic aqueous solution in which NaOH was dissolved in distilled water (dissolved such that a content of NaOH was 0.28 parts by weight based on 100 parts by weight of the basic aqueous solution) and the core particles prepared in Example 1 were mixed at a weight ratio of 1:1 (mass ratio of 140 g:140 g) and washed for 5 minutes. Thereafter, the washed product was subjected to separation filter treatment to have a moisture content of 5 to 12% and then dried at 130° C. Subsequently, the dried product from above was mixed with H$_3$BO$_3$ at a weight ratio of 100:0.57 and heat-treated at 300° C. for 8 hours to prepare a positive electrode active material coated with a Li—Na—Al—B—O solid solution.

Comparative Example 1

Distilled water and the core particles prepared in Example 1 were mixed at a weight ratio of 1:1 (mass ratio of 140 g:140 g) and washed for 5 minutes. Thereafter, the washed product was dried at 130° C. Subsequently, the dried product was heat-treated at 300° C. for 8 hours to prepare a positive electrode active material.

Comparative Example 2

Distilled water and the core particles prepared in Example 1 were mixed at a weight ratio of 1:1 (mass ratio of 140 g:140 g) and washed for 5 minutes. Thereafter, the washed product was dried at 130° C. Subsequently, the dried product from above was mixed with H$_3$BO$_3$ at a weight ratio of 100:0.57 and heat-treated at 300° C. for 8 hours to prepare a positive electrode active material coated with B.

Comparative Example 3

Distilled water and the core particles prepared in Example 1 were mixed at a weight ratio of 1:1 (mass ratio of 140 g:140 g) and washed for 5 minutes. Thereafter, the washed product was dried at 130° C. Subsequently, the dried product from above:NaOH:Al(OH)$_3$ were mixed in a molar ratio of 1:0.28:0.36 and heat-treated at 130° C. for 6 hours to form a first coating layer on a surface of the core particles. Subsequently, the lithium transition metal oxide on which the first coating layer was formed and H$_3$BO$_3$ were mixed in a molar ratio of 100:0.57 and heat-treated at 300° C. for 8 hours to prepare a positive electrode active material including a second coating layer formed on a surface of the first coating layer.

Comparative Example 4

A positive electrode active material coated with a Na—B—O solid solution was prepared using the same method as in Example 2 except that, as a positive electrode active material precursor, lithium-nickel-cobalt-manganese-aluminum oxide, which is a core particle, prepared by mixing LiOH·H$_2$O, Ni$_{0.88}$Co$_{0.05}$Mn$_{0.07}$(OH)$_2$, and Al(OH)$_3$, such that a molar ratio of Li:transition metal:Al became 1.02: 0.98:0.02 and firing the mixture at 780° C. for 12 hours, was used.

Experimental Example 1: Confirmation of Formation of Coating Layer

Figure 1A:
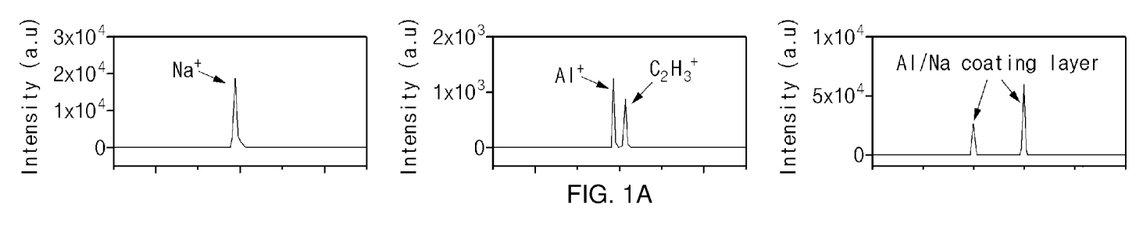
FIGS. 1A to 1C illustrate positive ion spectrum analysis results for Example 1, Example 2, and Comparative Example 2, respectively.
Figure 1B:
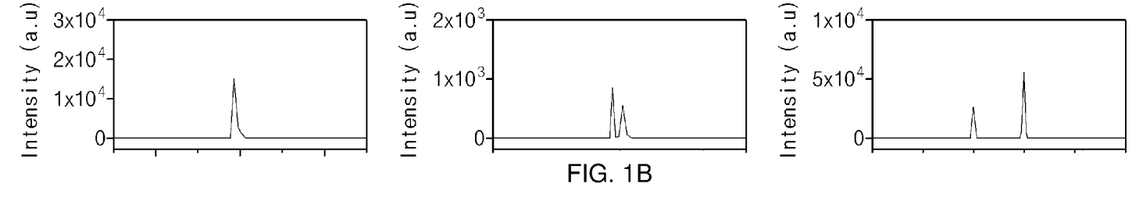
Figure 1C:
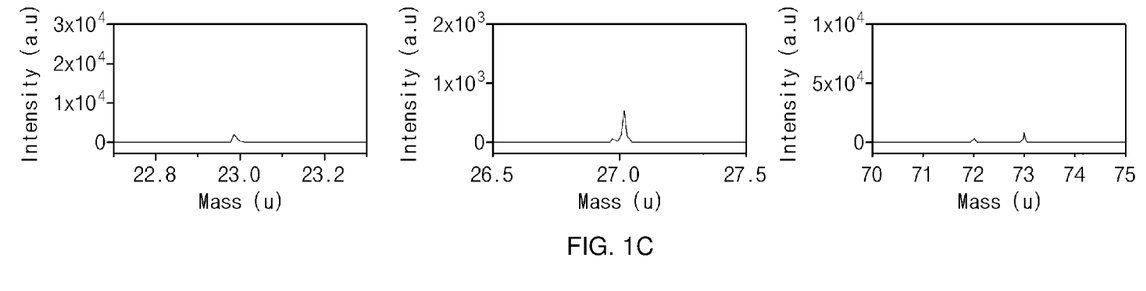
Figure 2A:
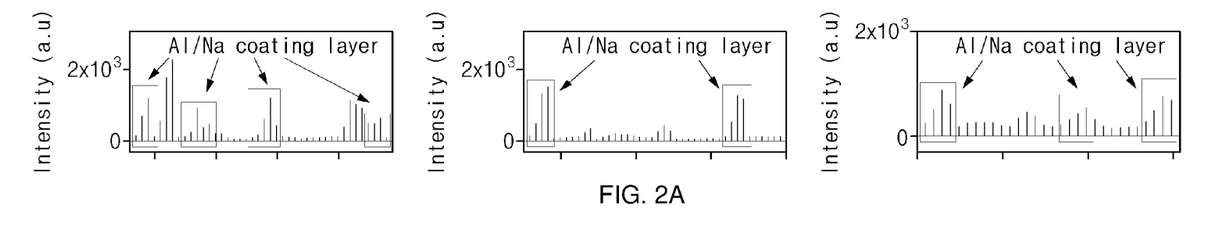
FIGS. 2A to 2C illustrate negative ion spectrum analysis results for Example 1, Example 2, and Comparative Example 2, respectively.
Figure 2B:
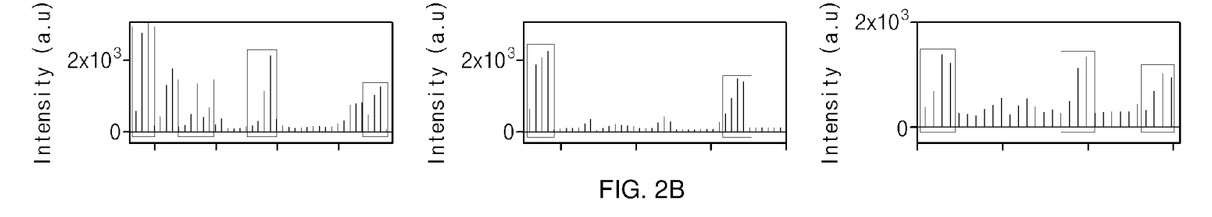
Figure 2C:
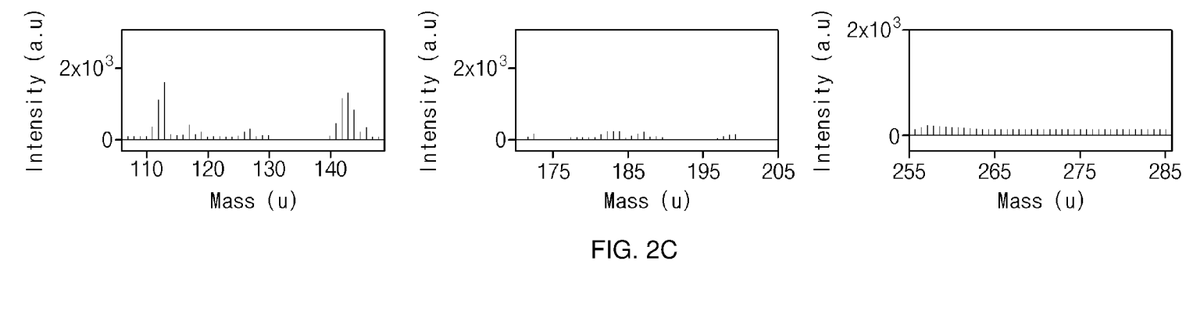

A positive ion spectrum and a negative ion spectrum of the surface of each of the positive electrode active materials prepared in Examples 1 and 2 and Comparative Example 2 were measured using time of flight secondary ion mass spectrometry (ToF.SIMS 5, manufactured by ION-TOF GmbH), and the results are shown in FIGS. 1 and 2.

First, FIGS. 1A to 1C illustrate the positive ion spectrum analysis results for Example 1, Example 2, and Comparative Example 2, respectively.

Referring to the positive ion analysis results of the outermost surface of each of the positive electrode active materials prepared in Example 1, Example 2, and Comparative Example 2, it was confirmed that, in Examples 1 and 2, peaks of Na$^+$ and Al$^+$ were strongly observed in a region of a mass of 72 to a mass of 73, whereas in Comparative Example 2, peaks were not observed in the region.

In addition, it was confirmed that, in both positive ion spectra of Examples 1 and 2, the ratio of the intensity of a peak (peak of C$_2$H$_3^+$) detected at a mass exceeding 27 and a mass of 27.5 or less and the intensity of a peak of Al$^+$ was in a range of 1:0.5 to 1:2, and specifically, 1:1 to 1:1.5. In contrast, it was confirmed that the peak of Al$^+$ was not observed in the positive ion spectrum of Comparative Example 2. Meanwhile, although a positive ion spectrum of the surface of the positive electrode active material prepared in Comparative Example 4 was not shown, it was confirmed that a peak of Al$^+$ was not observed even in the positive ion spectrum of Comparative Example 4.

Further, FIGS. 2A to 2C illustrate the negative ion spectrum analysis results for Example 1, Example 2, and Comparative Example 2, respectively.

Referring to the negative ion analysis results of the outermost surface of each of the positive electrode active materials prepared in Example 1, Example 2, and Comparative Example 2, it was confirmed that, in Examples 1 and 2, strong peaks observed in a region of each of a mass of 110, a mass of 115, a mass of 125, a mass of 172, a mass of 198, a mass of 257, a mass of 275, and a mass of 284, and it could be predicted that these peaks were due to the formation of the coating layer including Al and Na. In contrast, in the case of Comparative Example 2, it was confirmed that peaks were not observed in each region.

Experimental Example 2: Confirmation of High-Temperature Characteristics of Lithium Secondary Battery A lithium secondary battery was manufactured using the positive electrode active material prepared in each of Examples 1 and 2 and Comparative Examples 1 to 4 and high-temperature characteristics thereof were measured. Here, the lithium secondary battery was manufactured using the same method as described below except that the positive electrode active material prepared in each of Examples 1 and 2 and Comparative Examples 1 to 4 was used.

Specifically, the positive electrode active material, which was prepared in each of Examples 1 and 2 and Comparative Examples 1 to 4, a carbon black conductive material, and a PVDF binder were mixed in a weight ratio of 97.5:1.15: 1.35, and the mixture was mixed in an NMP solvent to prepare a composition for forming a positive electrode. The composition for forming a positive electrode was applied to an Al current collector having a thickness of 12 μm, dried, and roll-pressed to manufacture a positive electrode. Each of the positive electrodes manufactured above and lithium metal as a negative electrode were laminated together with a porous polyethylene separator and then put into a battery case, and an electrolyte solution, in which 1 M LiPF$_6$ and other additives were dissolved in a mixed solvent in which EC:dimethyl carbonate (DMC):EMC were mixed at a ratio of 3:4:3, was injected into the battery case to manufacture lithium secondary batteries according to Examples 1 and 2 and Comparative Examples 1 to 4.

At a temperature of 45° C., each of the lithium secondary batteries of Examples 1 and 2 and Comparative Examples 1 to 4 was charged at a constant current of 0.33 C to 4.25 V, under a condition of 0.05 C cut off. Then, discharging was performed at a constant current of 0.33 C to 2.5 V.

The charging and discharging behavior was set as one cycle, and such a cycle was repeatedly performed 30 times, and then lifespan characteristics at a high temperature (45° C.) and a resistance increase rate at a high temperature according to Examples 1 and 2 and Comparative Examples 1 to 4 were measured, and the results are shown in Table 1 below and FIGS. 3 and 4.

TABLE 1

|  | Capacity retention rate (%) | Resistance increase rate (%) |
| --- | --- | --- |
| Example 1 | 98.1 | 138.6 |
| Example 2 | 97.5 | 130.9 |
| Comparative Example 1 | 92.9 | 244.4 |
| Comparative Example 2 | 96.2 | 176.7 |
| Comparative Example 3 | 96.0 | 189.1 |
| Comparative Example 4 | 94.9 | 233.7 |

Figure 3:
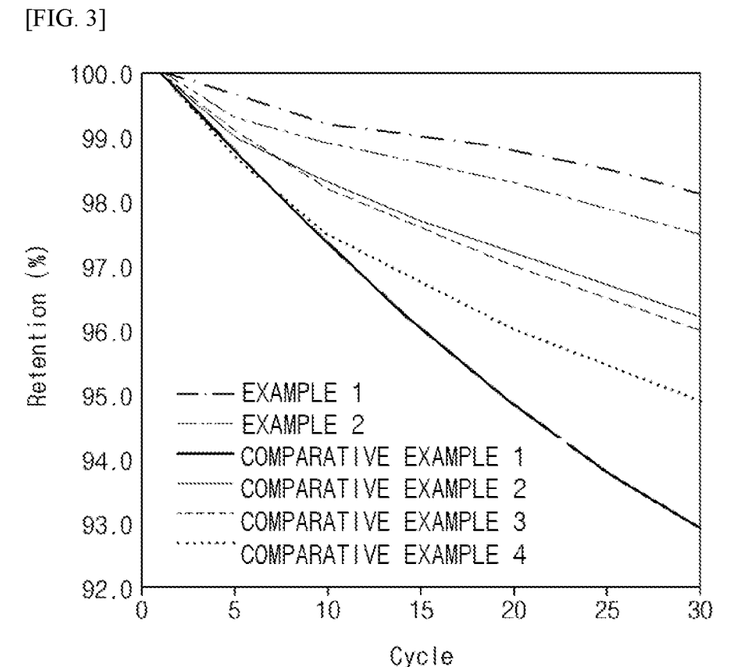
FIG. 3 is a graph illustrating high-temperature lifespan characteristics of secondary batteries manufactured in Examples 1 and 2 and Comparative Examples 1 to 4.
Figure 4:
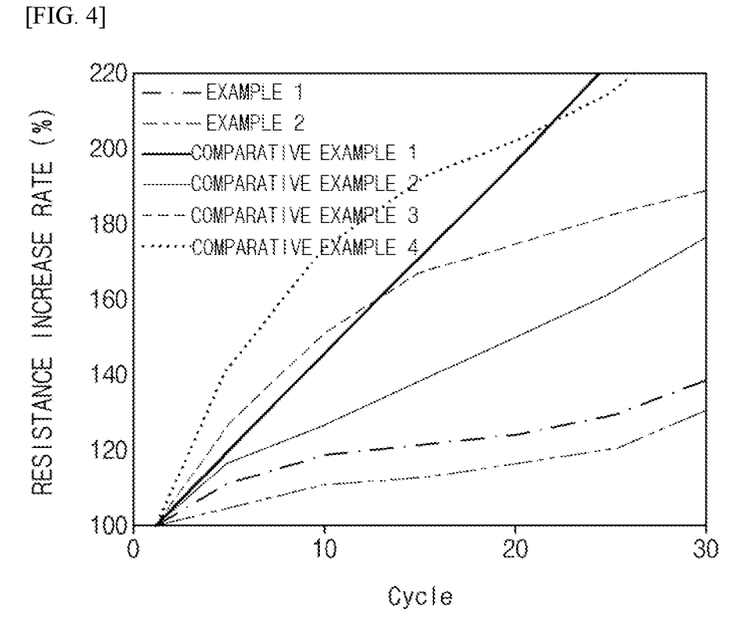
FIG. 4 is a graph illustrating high-temperature resistance characteristics of the secondary batteries manufactured in Examples 1 and 2 and Comparative Examples 1 to 4.

As shown in Table 1 and FIGS. 3 and 4, it was confirmed the secondary batteries manufactured in Examples 1 to 2 were significantly superior in both high-temperature lifespan characteristics and resistance characteristics compared to the secondary batteries prepared in Comparative Examples 1 to 4.

In conclusion, in the present invention, it can be seen that, during preparation of positive electrode active material, by forming a first coating layer on a surface of a lithium transition metal oxide having a high nickel content using a basic aqueous solution, which includes a coating element M$^1$ (where M$^1$ includes at least one selected from Na and Al), and forming a second coating layer including a coating element M$^2$ (where M$^2$ includes B), in a battery to which the positive electrode active material is applied, cycle characteristics, particularly, high-temperature lifespan characteristics may be improved, and a resistance increase rate at a high temperature may be suppressed.

The invention claimed is:
1. A positive electrode active material comprising:
a lithium transition metal oxide represented by Formula 2 below;
a first coating layer formed on a surface of the lithium transition metal oxide, wherein the first coating layer includes a coating element $M^1$, wherein $M^1$ includes aluminum (Al), or aluminum (Al) and sodium (Na); and a second coating layer, wherein the second coating layer includes a coating element $M^2$, wherein $M^2$ includes boron (B), wherein, when $M^1$ includes Al, in a time-of-flight secondary ion mass analysis spectrum of the positive electrode active material, a ratio of the intensity of a peak detected at a mass exceeding 27 and a mass of 27.5 or less and the intensity of a peak of $Al^+$ is 1:0.5 to 1:2, $$Li_{a1}Ni_{b1}Co_{c1}Mn_{d1}Al_{e1}X_{f1}O_2 \qquad \text{[Formula 2]}$$

wherein, in Formula 2,
$1.03 \leq a1 \leq 1.12$, $0.7 \leq b1 < 1.0$, $0 < c1 \leq 0.3$, $0 < d1 \leq 0.3$, $0 < e1 \leq 0.1$, and $0 \leq f1 \leq 0.1$, and X includes one or more selected from the group consisting of zirconium (Zr), B, tungsten (W), magnesium (Mg), cerium (Ce), hafnium (Hf), tantalum (Ta), titanium (Ti), strontium (Sr), barium (Ba), fluorine (F), phosphorus (P), sulfur (S), and lanthanum (La).

2. The positive electrode active material of claim 1, wherein
the second coating layer is formed on a surface of the first coating layer.

3. The positive electrode active material of claim 1, wherein the first coating layer and the second coating layer are a mixed coating layer formed on the surface of the lithium transition metal oxide.

4. The positive electrode active material of claim 3, wherein the mixed coating layer includes a $Li-M^1-M^2-O$ solid solution, wherein $M^1$ includes one or more selected from Na and Al, and $M^2$ includes B.

5. The positive electrode active material of claim 1, wherein $M^1$ is included in an amount of 50 ppm to 10,000 ppm with respect to the total weight of the positive electrode active material.

6. The positive electrode active material of claim 1, wherein $M^1$ includes Na and Al.

7. A positive electrode for a lithium secondary battery comprising the positive electrode active material according to claim 1.

8. A lithium secondary battery comprising the positive electrode according to claim 7.

9. A method of preparing the positive electrode active material of claim 1, the method comprising:
forming the first coating layer on the surface of the lithium transition metal oxide represented by Formula 1 below using a basic aqueous solution containing the coating element $M^1$, wherein $M^1$ includes one or more selected from aluminum (Al), or aluminum (Al) and sodium (Na);

dry-mixing the lithium transition metal oxide having the first coating layer on the surface thereof and a raw material, wherein the raw material contains the coating element $M^2$, wherein $M^2$ includes boron (B); and heat treating the dry mixture to form the second coating layer, $$Li_aNi_bCo_cMn_dAl_eX_fO_2 \qquad \text{[Formula 1]}$$

wherein, in Formula 1,
$1.03 \leq a \leq 1.12$, $0.7 \leq b < 1.0$, $0 < c \leq 0.3$, $0 < d \leq 0.3$, $0 < e \leq 0.1$, and $0 \leq f \leq 0.1$, and X includes one or more selected from the group consisting of zirconium (Zr), B, tungsten (W), magnesium (Mg), cerium (Ce), hafnium (Hf), tantalum (Ta), titanium (Ti), strontium (Sr), barium (Ba), fluorine (F), phosphorus (P), sulfur(S), and lanthanum (La).

10. The method of claim 9, wherein
the forming of the first coating layer comprises:
washing the lithium transition metal oxide represented by Formula 1 with a washing solution;
separating the lithium transition metal oxide from the washing solution; and
mixing the lithium transition metal oxide with the basic aqueous solution; and
then drying the mixture to form the first coating layer.

11. The method of claim 9, wherein
the forming of the first coating layer comprising:
mixing and washing the lithium transition metal oxide represented by Formula 1 with the basic aqueous solution;
separating the lithium transition metal oxide from the basic aqueous solution; and
then drying the lithium transition metal oxide to form the first coating layer.

12. The method of claim 10, wherein, after separation from the washing solution, the lithium transition metal oxide has a moisture content of 3% to 15%.

13. The method of claim 10, wherein the washing solution is used in an amount of 60 parts by weight or more to 200 parts by weight or less with respect to 100 parts by weight of the lithium transition metal oxide.

14. The method of claim 9, wherein the basic aqueous solution includes one or more selected from the group consisting of LiOH, KOH, NaOH, $Ba(OH)_2$, $Na_2CO_3$, NaCl, $CH_3COONa$, $Na_2SO_4$, $NaNO_2$, $NH_4OH$, $CH_3CO_2NH_4$, $(NH_4)_2SO_4$, $NH_4NO_3$, $(NH_4)_2HPO_4$, $P_2O_5$, $H_3PO_4$, $H_3BO_3$, HF, HCl, $HNO_3$, $H_2O_2$, $Mg(OH)_2$, $Ca(OH)_2$, $Al_2O_3$, $Al(OH)_3$, $AlF_3$, $AlBr_3$, $AlPO_4$, $AlCl_3$, $Al(NO_3)_3$, $Al(NO_3)_3 \cdot 9H_2O$, $Al_2(SO_4)_3 \cdot H_2O$, $Al(H_2PO_4)_3$, $C_2H_5O_4Al$, $Al(SO)_4$, $NaAlO_2$, $Al_2CoO_4$, $LaAlO_3$, and $MgAl_2O_4$.

15. The method of claim 9, wherein the raw material includes one or more selected from the group consisting of $H_3BO_3$, $B_2H_4O_4$, and $B_2O_3$.

* * * * *